(12) United States Patent
Kerr (10) Patent No.: US 6,435,246 B1
(45) Date of Patent: Aug. 20, 2002

(54) LAMINATOR ASSEMBLY HAVING A PRESSURE ROLLER WITH A PERFORATED LAYER AND A BELT FOR A LAMINATOR

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 11 days.

(21) Appl. No.: 09/772,796

(22) Filed: Jan. 30, 2001

(51) Int. Cl.⁷ .............................. B30B 5/04; B30B 15/34
(52) U.S. Cl. .................. 156/553; 156/555; 156/582; 156/583.5
(58) Field of Search ................... 156/553, 555, 156/580, 582, 583.1, 583.5; 492/28, 46, 48, 49; 100/327, 334, 160, 176

(56) References Cited

U.S. PATENT DOCUMENTS

| | | | |
|---|---|---|---|
| 4,110,152 A | * | 8/1978 | Dunning et al. ............ 156/553 |
| 4,251,313 A | * | 2/1981 | Abe ............................ 156/473 |
| 4,618,394 A | * | 10/1986 | Hoffmann ................... 156/473 |
| 5,203,942 A | | 4/1993 | DeCook et al. ............. 156/230 |
| 6,066,218 A | * | 5/2000 | Kuhn et al. .................... 156/87 |
| 6,149,755 A | * | 11/2000 | McNichols et al. ......... 156/264 |

\* cited by examiner

Primary Examiner—James Sells
(74) Attorney, Agent, or Firm—Buskop Law Group (57) ABSTRACT

A laminator assembly and lamination method which comprise: a first roller located on a first side of a media passage;
  a second roller located on a second side of said media passage so as to oppose said first roller, wherein a nip portion is defined between said first and second rollers so as to apply pressure to media in said media passage which passes through said nip portion; and
  wherein at least one of said first and second rollers is a roller comprising a substantially solid layer (42), a deformable layer (48) surrounding said substantially solid layer, and a perforated layer (46) surrounding said deformable layer forming an outer surface of said at least one of said first and second rollers.

49 Claims, 8 Drawing Sheets

LAMINATOR ASSEMBLY HAVING A PRESSURE ROLLER WITH A PERFORATED LAYER AND A BELT FOR A LAMINATOR

FIELD OF THE INVENTION

The present invention relates to the art of color proofing, and in particular, to an improved lamination assembly and roller for preparing prepress color proofs, such as by the use of pressure and heat to laminate media together. It should be known that this invention could be used in any field that uses rollers or belts to convey or fuse media.

BACKGROUND OF THE INVENTION

Pre-press color proofing is a procedure used by the printing industry to create representative images of printed material. The proof is used to check for color balance and other important image quality control parameters, without the high cost and time that would be required to actually produce printing plates set up a printing press to produce an example of an intended image. The pre-press color proof of the intended image may require several corrections and may be reproduced several times to satisfy or meet the requirements of the customers, resulting in a large loss of profits and ultimately higher costs to the customer.

Color proofs sometimes called "off press" proofs or prepress proofs, are one of three types. The first is a color overlay that employs an image on a separate base for each color. The second a single integral sheet process in which the separate color images are transferred by lamination onto a single base. The third is a digital method in which the images are produced directly onto or transferred by lamination onto a single base from digital data.

In one typical process for a prepress color proofing system used in the printing industry, a multicolor original is separated into individual transparencies, called color separations, the three subtractive primaries and black. Typically a color scanner is used to create the color separations and in some instances more than the four standard color separations are used. The color separations are then used to create a color proof that is sometimes called an "off press" proof or prepress proof as described above.

In one type of laminator, noted in a copending patent application cited above, a lamination sandwich sits on an entrance table. A leading edge of the lamination sandwich is fed into the laminator. An upper pressure roller and a lower pressure roller receive this lamination sandwich. The lamination sandwich passes completely between the upper heated pressure roller and a lower heated pressure roller coming to rest on an exit table. With the configuration of an upper heated pressure roller and a lower heated pressure roller as described above, the laminator is termed a straight-through laminator. As an additional reference U.S. Pat. No. 5,203,942 describes a lamination/de-lamination system as applied to a drum laminator.

While the above-described laminator works well for some materials and in limited conditions, there are many conditions and materials that cannot be laminated successfully using the above-described laminator. One problem is the intended image shifting from one color to another such that the dots/image from one color to the next are not overlaid correctly causing a misregistration of the intended image. The intended image may suffer from overall image growth and damage to some intended images may occur in the form of creases commonly know as rivers or valleys.

The aforementioned problems are for the most part due to the heated pressure rollers and the application thereof. The upper heated pressure roller and the lower heated pressure roller have hollow heater elements that are typically made of metal. The hollow portion of the heater element is for accepting a heating rod or lamp while a rubber layer or shell typically of silicone rubber is formed around the outside of the heater element. When the upper heated pressure roller and the lower heated pressure roller are pressed together, they form a nip or indentation. Within the nip formed by the upper heated pressure roller and the lower heated pressure roller, lateral shear stresses and overdrive conditions are formed. These lateral sheer stresses and overdrive conditions act upon the media being laminated together to cause the intended image to shift from one color to another color. These lateral sheer stresses and overdrive conditions can also cause a defect in the final lamination in the form of creases commonly known as rivers or a valley, as described above. These lateral sheer stresses and overdrive conditions can also cause image growth which can be different with each color, causing the intended image to be misregistered from one color to the next color or to be larger than the original image or printed image. Although adding a deformable layer as described in U.S. patent application Ser. No. 09/676,877 helps to eliminate the above mentioned problems there is still room for improvement.

SUMMARY OF THE INVENTION

An object of the present invention is to provide for an apparatus and method that overcome the drawbacks noted above.

The invention relates to a laminator assembly comprising: a first roller located on a first side of a media passage; a second roller located on a second side of said media passage so as to oppose said first roller, wherein a nip portion is defined between said first and second rollers so as to apply pressure to media in said media passage which passes through said nip portion; and wherein at least one of said first and second rollers is a roller comprising a substantially solid layer which may be solid. Surrounding this substantially solid layer is a deformable layer. Surrounding the substantially solid layer is a perforated layer which in alternative embodiments can be a solid layer upon which have disposed a coating, leaving a portion of the solid layer uncoated. These uncoated portions can be in the shape of arcs, curves, or circles or any one of a number of shapes. Alternatively, the perforations on this layer may be in the form of a shapes as well. One or more of the rollers can be heated or adapted to accept a heating element.

The present invention provides for a roller arrangement that overcomes lateral shear stresses and overdrive conditions, and allows the use of low durometer rubber or of a compressible rubber, and can be used in laminators or any number of devices, including copiers and fax machines.

The present invention further provides for a heated pressure roller embodiment that allows a wider range of conditions for lamination.

The present invention further provides for a pressure roller that allows a wider range of conditions for conveying media.

The present invention also provides for a roller arrangement that helps overcome image shift from one color to another and overall image growth. Additionally, the present invention provides for a heated pressure roller that improves defects such as creases/rivers or valleys.

According to a feature of the present invention, a laminating system for bonding, to a paper receiver stock, a thermal print media of the type including a carrier and a material to be applied to the paper receiver stock, includes an improved pair of pressure rollers, which can be heated. Through these rollers, media or a lamination sandwich of thermal print media and paper receiving stock can be fed. The pair of rollers having been improved by adding, to at least one of the pressure rollers, a metal or plastic perforated belt or tube over a rubber or otherwise deformable material layer of the heated roller. This coating serves to prevent lateral stresses, overdrive conditions from acting on the thermal print media or paper receiving stock or allow the media to slip.

The present invention relates to a drive roller assembly for conveying media, which is comprised of opposing rollers. The rollers of this assembly, which optionally can comprise a heater element, consist of a first deformable layer, a second perforated layer which surrounds the first de-formable layer and forms an outer surface of one of the first and second opposing rollers or both.

The present invention relates to a belt for conveying media, which is comprised of a de-formable layer and a perforated layer or covering.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed, in particular, to elements forming part of, or cooperating more directly with, an apparatus in accordance with the present invention. It is to be understood that elements not specifically shown or described may take various forms well known to those skilled in the art. For the sake of discussion, but not limitation, the preferred embodiment of the present invention will be illustrated in relation to a laminating apparatus for making image proofs on a paper receiver stock, since the usual proofing practice is to make a hard copy of the image proof on paper. The present invention, however, is not limited to making hard copies of proof images on paper, since it can produce hard copies of images on a wide variety and thicknesses of media that may be used in the printing process.

Figure 1:
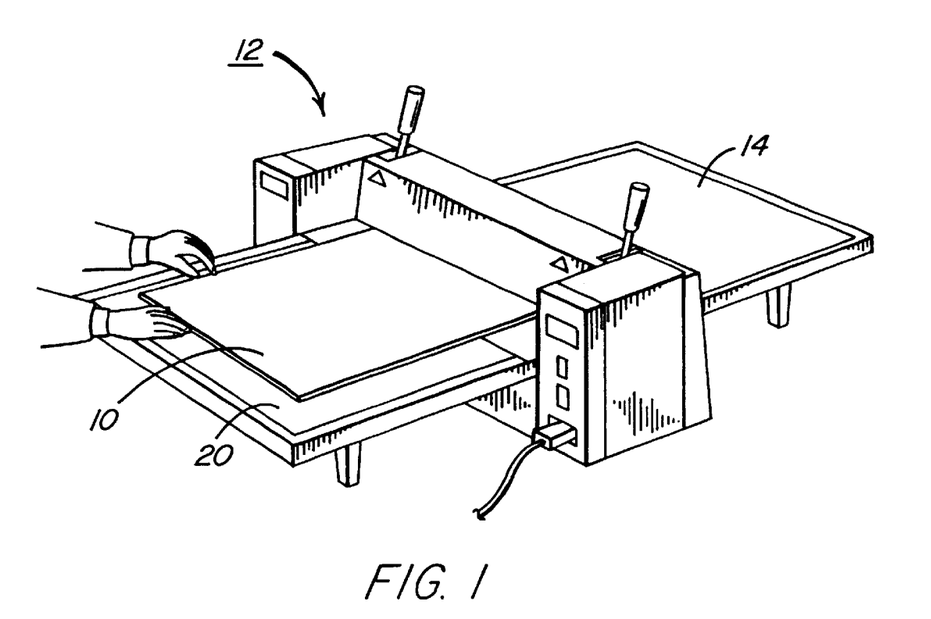
FIG. 1 is a perspective view showing a laminator known in the related art.

Referring to the drawings, wherein like reference numerals represent identical or corresponding parts throughout the several views, FIG. 1 shows an embodiment of a laminator 12 incorporating the present invention. Laminator 12 receives lamination sandwich 10, which is initially placed on entrance table 20. The laminator sandwich 10 is passed through the rollers shown in more detail in FIG. 2, and exits the rollers onto exit table 14.

Figure 2:
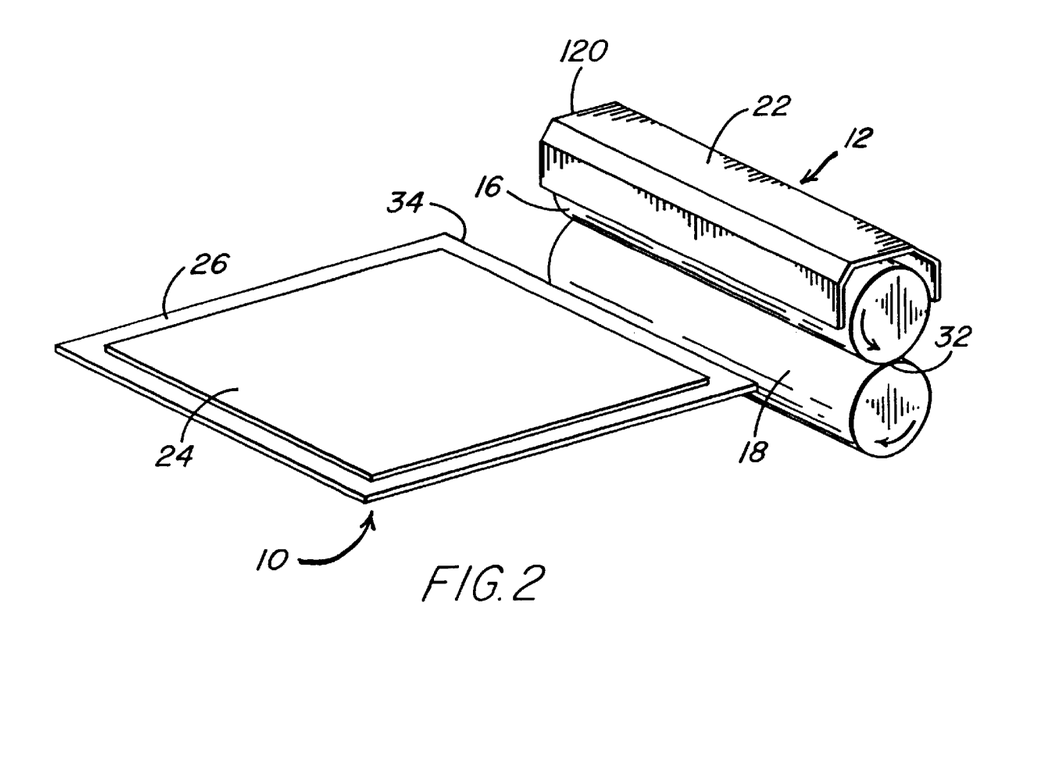
FIG. 2 is a perspective view showing the loading operation of a laminator according to a preferred embodiment of the present invention.

FIG. 2 shows a portion of laminator 12, particularly the pair of rollers, in the form of an upper pressure roller 16 and a lower pressure roller 18, one or more of these rollers can be heated. Upper pressure roller 16 is provided with a roller cover 22 or a heat shield.

As shown in FIG. 2, media in the form of an assembled lamination sandwich 10 is made up of thermal print media 24 and paper receiving stock 26. Thermal print media 24 can include a transfer layer, not shown, on an image bearing side of thermal print media 24 which faces paper receiving stock 26, and which is to be applied to paper receiving stock 26 when pressure and optionally heat, are applied to lamination sandwich 10.

Figure 3:
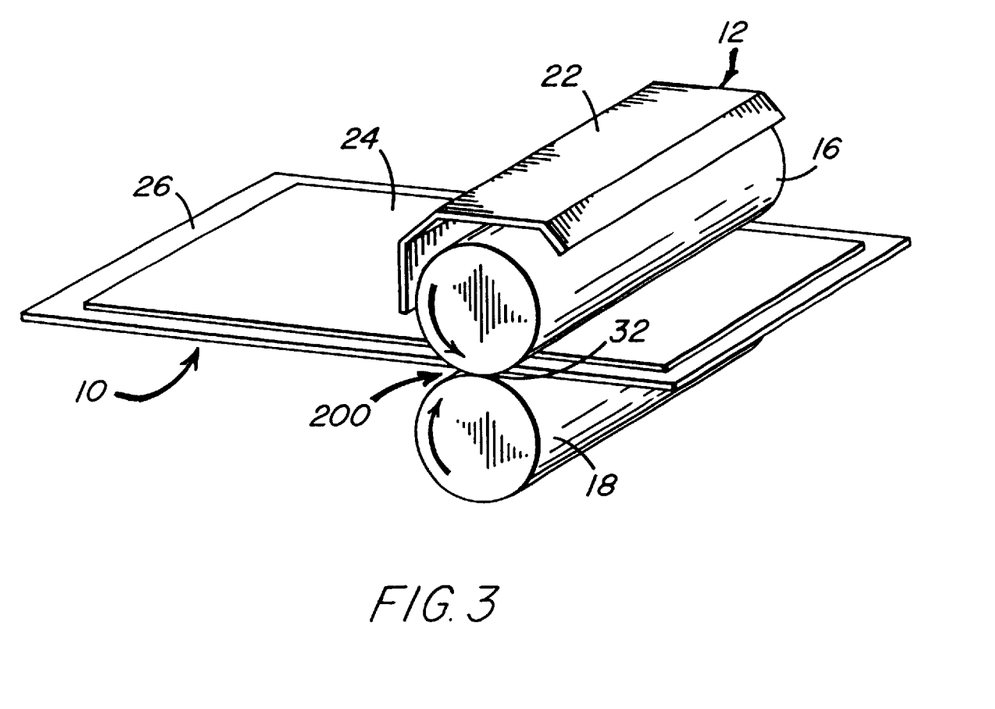
FIGS. 3–5 are schematic side elevation views showing progressive stages of operation of the laminator of FIG. 2.
Figure 4:
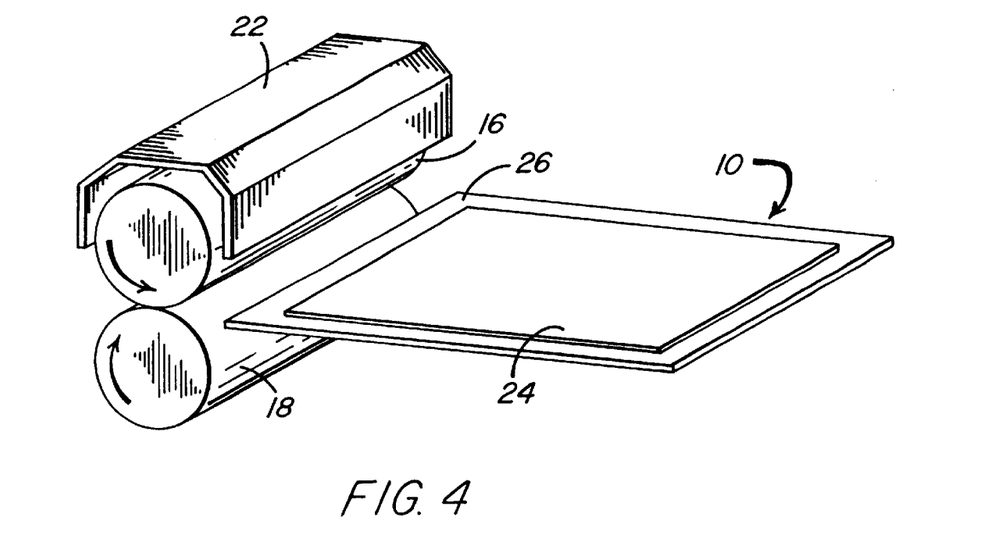
Figure 5:
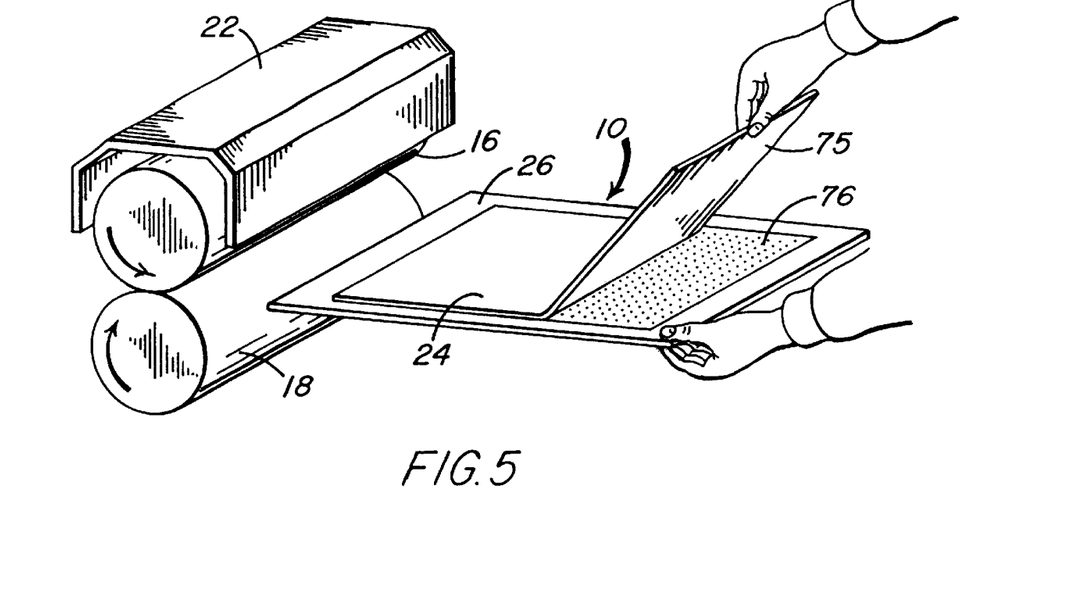

Referring now to FIGS. 3–5, lamination sandwich 10 is made up of thermal print media 24 positioned on paper receiving stock 26. This lamination sandwich 10 travels along a media passage 200 to a nip portion 32 between pressure rollers 16 and 18. Upper pressure roller 16 and lower pressure roller 18 can may optionally, each contain a heating element, noted as heating element 30 and heating element 31, respectively, which are shown in more detail in FIG. 6.

Heating elements 30 and 31, respectively apply, heat which migrates to the surfaces of upper pressure roller 16 and lower pressure roller 18. The heating of rollers 16 and 18 can be done wherein only one roller is heated, or both rollers are heated simultaneous depending on the embodiment of the invention. Both embodiments are considered within the scope of this invention.

In the most preferred embodiment, pressure is applied to upper pressure roller 16 and lower pressure roller 18 in a known manner by, for example, eccentric rollers, pressure levers, or other means that are not shown. Lower pressure roller 18 can be driven such that when upper pressure roller 16 and lower pressure roller 18 are pressed together, they both rotate.

Returning again to FIG. 2, the lead edge 34 of lamination sandwich 10 is fed into nip portion 32 formed by moving upper pressure roller 16 and lower pressure roller 18.

FIG. 3 shows lamination sandwich 10 enters media passage 200 wherein the thermal print media 24 is pressed onto paper receiving stock 26 as they pass through nip portion 32 which is formed by upper pressure roller 16 and lower pressure roller 18.

FIG. 4 shows lamination sandwich 10 once it has emerged from the nip portion 32 formed by upper pressure roller 16 and lower pressure roller 18 being pressed together.

FIG. 5 shows that after lamination sandwich 10 cools sufficiently, a support layer of thermal print media 75 is peeled from the laminated sandwich 10 leaving behind a prepress proof 76.

Figure 6:
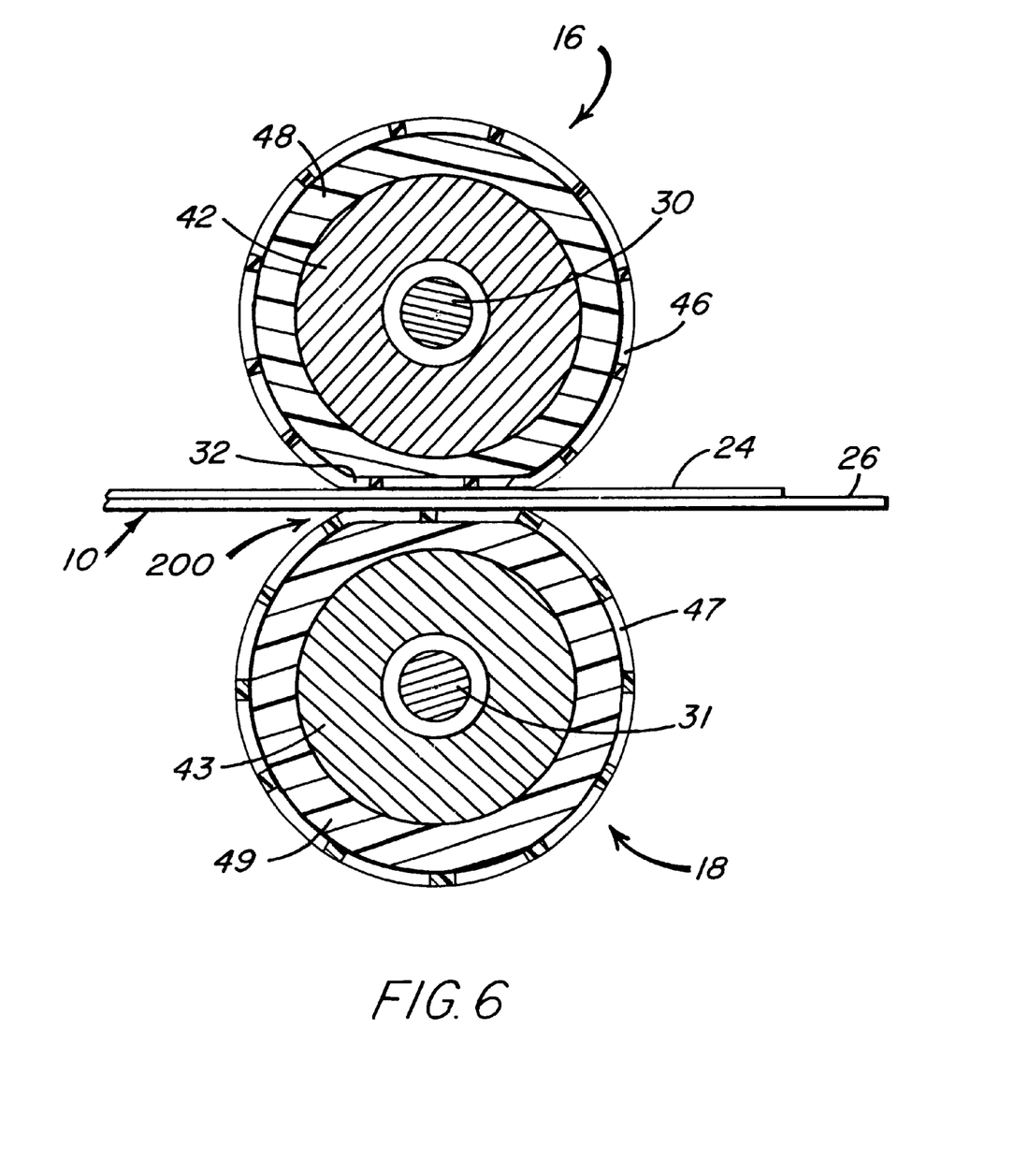
FIGS. 6–8 are schematic side elevation views showing alternative details of the pressure rollers according to the present invention of FIG. 2.
Figure 7:
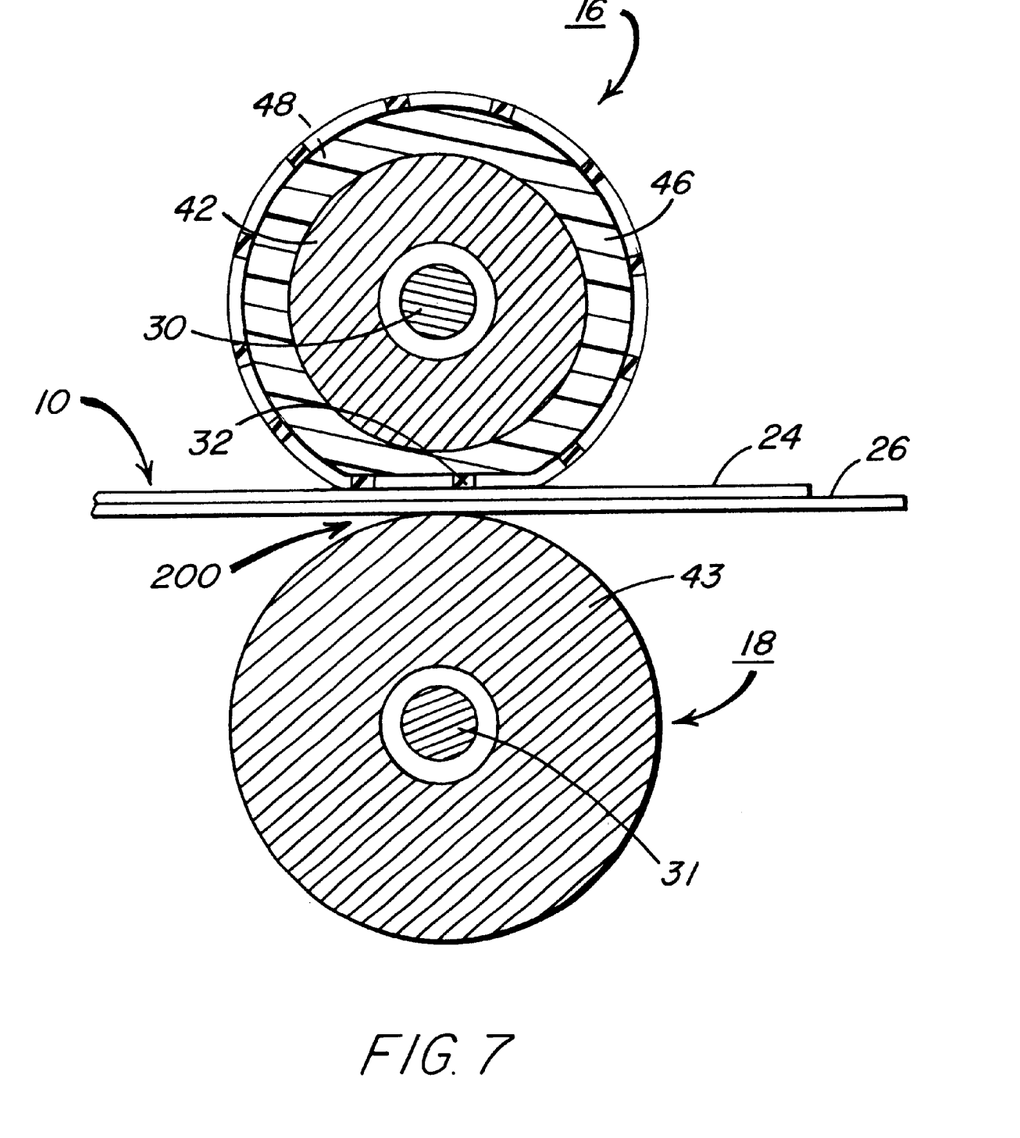
Figure 8:
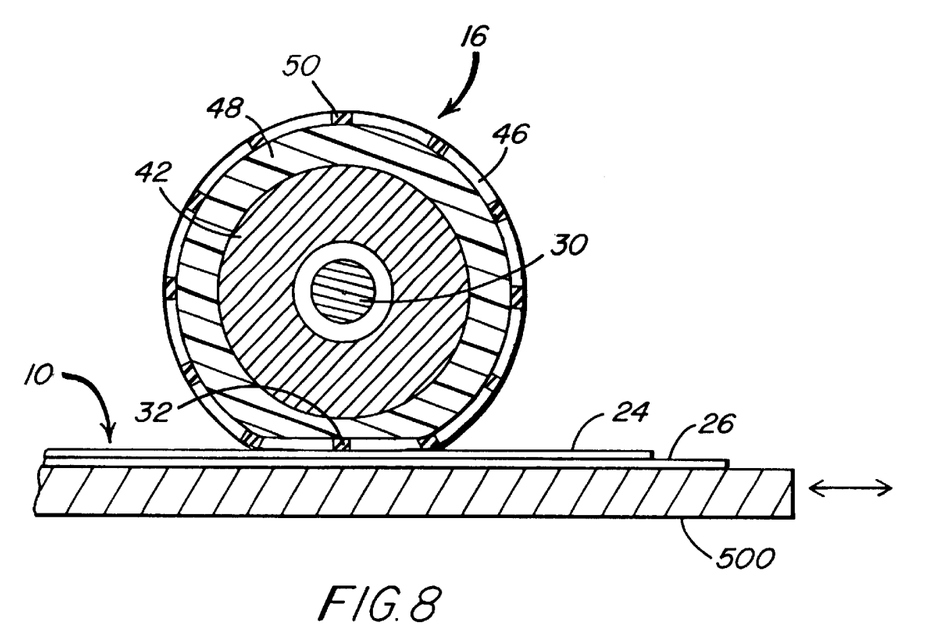

FIGS. 6–8 are schematic side elevation views showing details as well as alternate details of pressure rollers 16 and 18 according to the present invention.

In FIG. 6, upper pressure roller 16 and lower pressure roller 18 are shown with the lamination sandwich 10 disposed between the rollers. In this embodiment, both upper pressure roller 16 and lower pressure roller 18 have identical construction. Alternative embodiments of this invention are contemplated wherein upper pressure roller 16 has a different construction from lower pressure roller 18.

FIG. 6 shows upper pressure roller 16 and lower pressure roller 18, each having a substantially solid layer 42, and substantially solid layer 43 respectively, which can be made from a thermally conductive material. These layers 42 and 43 may be either (i) substantially solid or (ii) hollow. The substantially solid layers 42 and 43 can be adapted to receive heater elements 30 and 31, respectively. Surrounding layers 42 and 43, are deformable sleeves or layers, 48 for roller 16, and 49 for roller 18. The deformable layers 48 and 49 can contact the substantially solid material layers in one embodiment, in the form of a bond. The bonding can be performed with an adhesive layer.

Deformable layers 48 and 49 can made from one or a combination of materials, including but not limited to a low durometer rubber, a compressible rubber, a solid rubber silicone, a foam silicone rubber or others materials having similar deformable characteristics, such as urethane. A low durometer rubber usable in the invention is available from the Dow Corning Corporation.

A perforated roller sleeve or layer 46 for roller 16, and 47 for roller 18 is disposed over the deformable layer. This perforated layer can comprise, at least in part, a second deformable material.

In an alternative embodiment, perforated roller sleeves or layers 46 and 47 may, encapsulate the entire surface area of layers 48 and 49. Perforated roller sleeves or layers 46 and 47 can be a material selected from the group: a metal layer, a plastic belt, a plastic tube or a plastic coating. Any number of usable thermoplastics could be used as the plastic coating or for the plastic belt or tube. A fluropolymer could be used as the perforated layer. Other usable materials include polyamindes, polyisocyanates, polyphenylene sulfides, polycarbonates, copolymers thereof, and combinations thereof. A preferred polyamide is nylon 6,6. Nylon 6,10 is also contemplated as usable for perforated layers 46 and 47.

As lamination sandwich 10 passes nip portion 32, deformable layers 48 and 49 and perforated roller sleeves or layers 46 and 47 deform to increase the width of nip portion 32 to form an enlarged nip width for nip portion 32. The arrangement of the present invention permits the width of nip portion 32 to be decreased or increased as needed by between about 5 millimeters to 30 millimeters.

Nip portion 32 is substantially uniform as it extends along the rotational axis of pressure rollers 16 and 18. This configuration eliminates or minimizes lateral shear stresses and overdrive as lamination sandwich 10 passes nip portion 32.

In the embodiment of FIG. 6, given that both rollers are of the same construction, the increased width nip portion 32 is formed on both sides of media passage 200.

In the embodiment of FIG. 7, the upper roller 16 has the same construction as the pressure roller 16 shown in FIG. 6. However, in this embodiment, pressure roller 18 is made of a different construction, wherein a heater element 31 is surrounded only by a layer of solid or substantially solid material layers 43 such that only pressure roller 16 deforms to form nip portion 32. In an alternative version of the embodiment of FIG. 7, roller 18 can additionally have a deformable layer over a second solid layer 43.

FIG. 8 shows another embodiment in which pressure roller 16 has the same construction as pressure roller 16 of FIG. 7, however, in this embodiment, instead of a second roller 18, a movable platen 500 is shown disposed on the other side of roller 16, retaining lamination sandwich 10 on the platen as the platen 500 moves under pressure roller 16. Platen 500 additionally causes rotation of pressure roller 16. In this embodiment, pressure roller 16 deforms as shown in FIG. 7.

Figure 9:
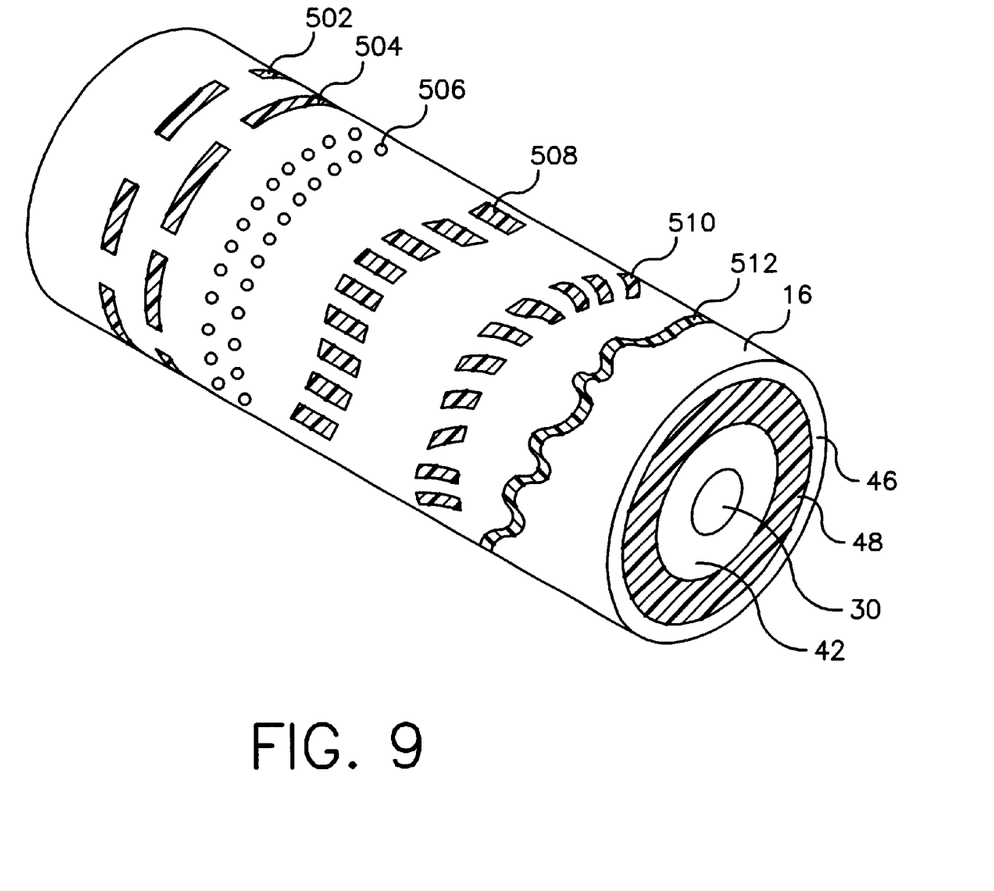
FIG. 9 is a perspective view showing a laminator roller of the present invention.

FIG. 9 shows still another embodiment of the invention wherein pressure roller 16 has the same construction as pressure roller 16 of FIGS. 6, 7 and 8. Pressure roller 18 now has a construction consisting of heater element 30, a substantially solid or solid material layer 42 disposed around the heater element 30 which layers are preferably the same materials used in the embodiment of FIG. 6. Disposed on the outer circumference of layer 42 is deformable layer 48. Surrounding deformable layer 48 is perforated layer 46 which can be a solid layer with a coating disposed on at least a portion of the layer 46, such that the non-coated portion forms geometric shapes, including but not limited to rectangular shapes, curves, arcs, circles and squiggles.

FIG. 9 shows several variations or the shapes of the non-coated areas on a solid layer 46, and the shapes of perforations for a perforated layer 46 on roller 16 which are within the scope of the invention.

The perforations or holes may take one or more of a variety of shapes including but not limited to radially disposed rectangular perforations 502, with or without opposing rectangular perforations 504, circular shaped perforations 506, radially diaposed rectangular perforations 508, or any of the numerous geometric shapes that are available.

Figure 10:
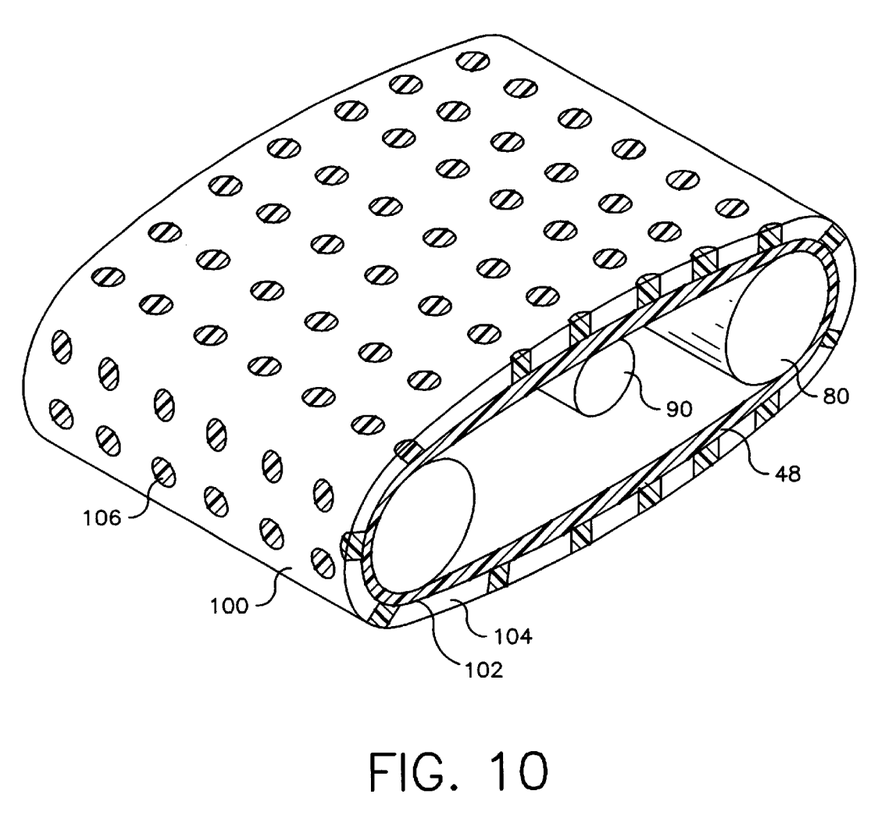
FIG. 10 is a perspective view showing a belt of the present invention.

To be clear, it is intended to be within the scope of the invention that the perforations could be omitted altogether and instead the perforated layer can be defined as a solid layer having an at least partially coated surface. The surface of layer 46 could be coated or masked with a material such as ones with a low coefficient of friction which particularly resist heat and deformation. A usable coating could be Teflon. These coatings could be disposed on the surface of the roller to form any number of uncoated shapes, including all the patterns shown in FIG. 9, such as the small arcs 510 or squiggles 512. This type of coating could be used on the roller which rotates over the lamination sandwich, such as pressure roller 16 which deforms to form nip portion 32. It also within the scope of the invention to use the coatings and create shapes on the moveable platen FIG. 10 shows a belt from a belted laminator from an end view. In this embodiment, the belt has a coating disposed on the outer surface and non-coated areas in the form of circles are presented. The belt can be coated in the same manner as the roller shown in FIG. 9.

Although the illustrated embodiments show both pressure rollers as heated pressure rollers, it is recognized that only one pressure roller may be the heated pressure roller. It is further recognized that both pressure rollers do not have to be heated for cold lamination applications. It is also further recognized that the pressure rollers do not have to be used for lamination applications but as conveying or drive rollers.

The invention has been described in detail with particular reference to certain preferred embodiments thereof, but it will be understood that variations and modifications can be effected within the scope of the invention.

PARTS LIST

10. Lamination sandwich
12. Laminator
14. Exit table
16. Upper pressure roller
18. Lower pressure roller
20. Entrance table
22. Roller cover
24. Thermal print media
26. Paper receiving stock 30. Heating element for roller 16
31. Heating element for roller 18
32. Nip portion
34. Lead edge
42. Substantially solid layer for roller 16
43. Substantially solid layer for roller 18
48. Deformable layer for roller 16
49. Deformable layer for roller 18
50. Perforation layer or in an alternative embodiment, layer with coatings
75. Support layer of thermal print media
76. Pre-press proof
200. Media passage
500. Movable platen
502. First set of axial rectangular perforations or coatings
504. Second set of axial rectangular perforations
506. Circular perforations
508. Transverse rectangular perforations
510. Non-coated roller surface having the shape of small arcs
512. Non-coated roller surface having the shape of squiggles

What is claimed is:

1. A laminator assembly comprising:
    a first roller located on a first side of a media passage;
    a second roller located on a second side of said media passage so as to oppose said first roller, wherein a nip portion is defined between said first and second rollers so as to apply pressure to media in said media passage which passes through said nip portion; and
    wherein at least one of said first and second rollers is a roller comprises a-substantially solid layer, a deformable layer surrounding said substantially solid layer, and a perforated layer surrounding said deformable layer, forming an outer surface of said at least one of said first and second rollers.

2. The laminator assembly according to claim 1, wherein said substantially solid layer is hollow.

3. The laminator assembly according to claim 1, wherein said substantially solid layer surrounds a heater element.

4. The laminator assembly according to claim 3, wherein said substantially solid layer is a material selected from the group: metal, a thermally conductive material, and combinations thereof.

5. The laminator assembly according to claim 1, wherein said deformable layer is a material selected from the group: a low durometer rubber, a compressible rubber, a solid rubber silicone, a foam silicone rubber, and a urethane.

6. The laminator assembly of claim 1, wherein said perforated layer comprises a material selected from the group: a metal, a plastic belt, a plastic tube and a plastic coating.

7. The laminator assembly of claim 6, wherein said perforated layer comprises a member of the group: polyamides, fluropolymers, polyisocyanates, polyphenylene sulfides, polycarbonates, copolymers thereof, and combinations thereof.

8. The laminator assembly of claim 7, wherein said polyamide comprises a member of the group: nylon 6,6, and nylon 6,10.

9. The laminator assembly of claim 1, wherein the perforated layer is a solid layer having a coating disposed on at least a portion of the outer surface.

10. The laminator assembly of claim 9, wherein said coating is a material having a low coefficient of friction.

11. The laminator assembly of claim 6, wherein said perforated layer has non-coated areas on said outer surface forming at least one shape.

12. The laminator assembly of claim 11, wherein the at least one shape is a member of the group comprising: a squiggle, a curve, a circle, an axial rectangular shape, a transverse rectangular shape, a small arc, and combinations thereof.

13. The laminator assembly of claim 1, wherein the perforated layer has at least one shaped perforation selected from the group comprising: a squiggle, a curve, a circle, an axial rectangular shape, a transverse rectangular shape, a small arc, and combinations thereof.

14. The laminator assembly of claim 1, wherein said substantially solid layer is solid.

15. The laminator assembly of claim 1, wherein said second roller consists of a heater element and a layer of substantially solid material surrounding said heater element.

16. The laminator assembly of claim 1, wherein said second roller consists of a heater element, a layer of substantially solid material surrounding said heater element, and a deformable layer surrounding said layer of substantially solid material.

17. A laminator assembly comprising:
    a moveable platen located on a first side of a media passage;
    a roller located on a second side of a media passage opposing said moveable platen, wherein said roller comprises, wherein a nip portion is defined between said moveable platen and said roller so as to apply pressure to media in said media passage which passes through said nip portion; and
    wherein said roller comprises a substantially solid layer, a deformable layer surrounding said substantially solid layer, and a perforated layer surrounding said deformable layer forming an outer surface.

18. The laminator assembly according to claim 17, wherein said substantially solid layer is hollow.

19. The laminator assembly according to claim 17, wherein said substantially solid layer comprises a material selected from the group: metal, a thermally conductive material, and combinations thereof.

20. The laminator of claim 17, wherein said roller further comprises a heater element capable of being heated.

21. The laminator assembly according to claim 17, wherein said deformable layer comprises a material selected from the group: a low durometer rubber, a compressible rubber, a solid rubber silicone, a foam silicone rubber, and a urethane.

22. The laminator assembly of claim 17, wherein said perforated layer comprises a material selected from the group: a metal, a plastic belt, a plastic tube, and combinations thereof.

23. The laminator assembly of claim 17, wherein the perforated layer comprises a material selected form the group: polyamides, fluropolymers, polyisocyanates, polyphenylene sulfides, polycarbonates, copolymers thereof, and combinations thereof.

24. The laminator assembly of claim 23, wherein said polyamide comprises a member of the group: nylon 6,6, and nylon 6,10.

25. The laminator assembly of claim 17, wherein the perforated layer is a solid layer having a coating disposed on at least a portion of the outer surface.

26. The laminator assembly of claim 25, wherein said coating is a material having a low coefficient of friction.

27. The laminator assembly of claim 17, wherein said perforated layer has non-coated areas on said outer surface forming at least one shape.

28. The laminator assembly of claim 27, wherein the at least one shape is a member of the group comprising: a squiggle, a curve, a circle, an axial rectangular shape, a transverse rectangular shape, a small arc, and combinations thereof.

29. The laminator assembly of claim 17, wherein the perforated layer has at least one shaped perforation selected from the group comprising: a squiggle, a curve, a circle, an axial rectangular shape, a transverse rectangular shape, a small arc, and combinations thereof.

30. The laminator assembly of claim 17, wherein said substantially solid layer is solid.

31. A roller assembly comprising:

first and second opposing rollers, wherein at least one of said first and second opposing rollers comprises a substantially solid layer, a deformable layer which surrounds said substantially solid layer, and a perforated layer which surrounds said deformable layer forming an outer surface.

32. A roller assembly according to claim 31, wherein said at least one of said first and second opposing roller is hollow.

33. A roller assembly according to claim 31, wherein said substantially solid layer comprises a material selected from the group: metal, a thermally conductive material, and combinations thereof.

34. A roller assembly according to claim 31, wherein said substantially solid layer is adapted to accept a heating element.

35. A roller assembly according to claim 31, wherein said deformable layer comprises a member of the group: a low durometer rubber, a compressible rubber, a solid rubber silicone, a urethane, and combinations thereof.

36. A roller assembly according to claim 31, wherein said perforated layer comprises a material selected from the group: a metal, a plastic belt, a plastic tube, and combinations thereof.

37. The roller assembly of claim 31, wherein said perforated layer comprises a member of the group: polyamides, fluropolymers, polyisocyanates, polyphenylene sulfides, polycarbonates, copolymers thereof, and combinations thereof.

38. The laminator assembly of claim 37, wherein said polyamide is a member of the group comprising: nylon 6,6, and nylon 6,10.

39. A roller assembly according to claim 31, wherein said perforated layer is solid having coatings disposed on at least a portion of the outer surface.

40. The roller assembly of claim 39, wherein said coating is a material having a low coefficient of friction.

41. The roller assembly of claim 31, wherein said first and second opposing rollers are adapted to receive a heating element.

42. The roller assembly of claim 31, wherein one of said first and second opposing rollers is a substantial solid roller.

43. A laminating method comprising the steps of:

forming a lamination sandwich;

placing the lamination sandwich at the entrance to a laminator such that the lamination sandwich passes between a first and second rollers and through a nip portion, wherein said first and second rollers are oriented so as to increase a width of a nip portion between a first and second rollers; and using a laminator wherein at least one of said first and second rollers comprises a substantially solid layer, a deformable layer surrounds said substantially solid layer, and a perforated layer surrounds said substantially solid layer.

44. A belt for a belted laminator comprising:

belt material which is substantially solid;

a deformable layer which overlays and is adhered to said belt material; and a perforated layer which surrounds said deformable layer forming an outer surface.

45. The belt of claim 44, wherein said perforated material comprises a polyamide, a fluropolymer, a polyisocyanate, a polyphenylene sulfide, a polycarbonate, copolymers thereof, and combinations thereof.

46. The belt of claim 44, wherein said perforated layer is a solid layer having a coating disposed on at least a portion of the outer surface.

47. The belt of claim 46, wherein said coating has a low coefficient of friction.

48. The belt of claim 47, wherein said perforated area has non-coated areas on the outer surface forming at least one shape.

49. The belt of claim 48, wherein the at least one shape is a member of the group comprising: a circle, a squiggle, a curve, an axial rectangular shape, a transverse rectangular shape, a small arc, and combinations thereof.

* * * * *